United States Patent [19]
Sato et al.

[11] Patent Number: 5,203,020
[45] Date of Patent: Apr. 13, 1993

[54] METHOD AND APPARATUS FOR REDUCING POWER CONSUMPTION IN A RADIO TELECOMMUNICATION APPARATUS

[75] Inventors: Hiroshi Sato; Kita Katsuhiko, both of Tokyo; Ishii Takaaki, Kanagawa, all of Japan

[73] Assignee: Kabushiki Kaisha Toshiba, Kawasaki, Japan

[21] Appl. No.: 769,570

[22] Filed: Oct. 2, 1991

Related U.S. Application Data

[63] Continuation of Ser. No. 707,225, May 24, 1991, abandoned, which is a continuation of Ser. No. 365,825, Jun. 14, 1989, abandoned.

[30] Foreign Application Priority Data

Jun. 14, 1988 [JP] Japan ............................ 63-146367
Jun. 14, 1988 [JP] Japan ............................ 63-146369

[51] Int. Cl.⁵ .......................... H04B 1/38; H04B 1/04
[52] U.S. Cl. .................................. 455/68; 455/38.3; 455/89; 455/127; 455/343; 379/58; 379/63
[58] Field of Search .................... 455/38, 54–56, 455/62–63, 67–68, 76–77, 166, 184–186, 226, 228, 343, 73, 89, 127, 38.3; 379/59–61, 63, 58

[56] References Cited

U.S. PATENT DOCUMENTS

| | | | |
|---|---|---|---|
| 4,286,335 | 8/1981 | Eichler et al. | 455/89 |
| 4,419,765 | 12/1983 | Wycoff et al. | 455/343 |
| 4,506,386 | 3/1985 | Ichikawa et al. | 455/228 |
| 4,627,107 | 12/1986 | Hohlfield | 455/89 |
| 4,631,496 | 12/1986 | Borras et al. | 455/343 |
| 4,636,741 | 1/1987 | Mitzlaff | 330/127 |
| 4,700,375 | 10/1987 | Reed | 379/61 |
| 4,736,461 | 4/1988 | Kawasaki et al. | 455/343 |
| 4,802,240 | 1/1989 | Yamaguchi et al. | 455/343 |
| 4,903,319 | 2/1990 | Kasai et al. | 455/33 |
| 4,921,464 | 5/1990 | Ito et al. | 455/343 |
| 5,033,111 | 7/1991 | Marvi | 455/127 |

FOREIGN PATENT DOCUMENTS

| | | |
|---|---|---|
| 0159670 | 10/1985 | European Pat. Off. |
| 0243899 | 11/1987 | European Pat. Off. |
| 0251007 | 1/1988 | European Pat. Off. |
| 0255048 | 2/1988 | European Pat. Off. |
| 0211332 | 11/1984 | Japan ............................ 455/343 |

*Primary Examiner*—Reinhard J. Eisenzopf
*Assistant Examiner*—Andrew Faile
*Attorney, Agent, or Firm*—Banner, Birch, McKie & Beckett

[57] ABSTRACT

A radio telecommunication apparatus is used in a radio telecommunication system wherein one or more base stations broadcast radio signals over a plurality of radio channels. The apparatus selects at least a radio channel out of the plurality of radio channels and detects the availability of the selected radio channel. In response to the unavailability of the selected radio channel, the apparatus is intermittently powered so as to detect the availability of the selected radio channel while conserving battery power consumption. Even if the availability of the selected radio channel is detected, only reception and transmission sections are intermittently powered so that the presence of information signals to be transmitted is detected.

11 Claims, 8 Drawing Sheets

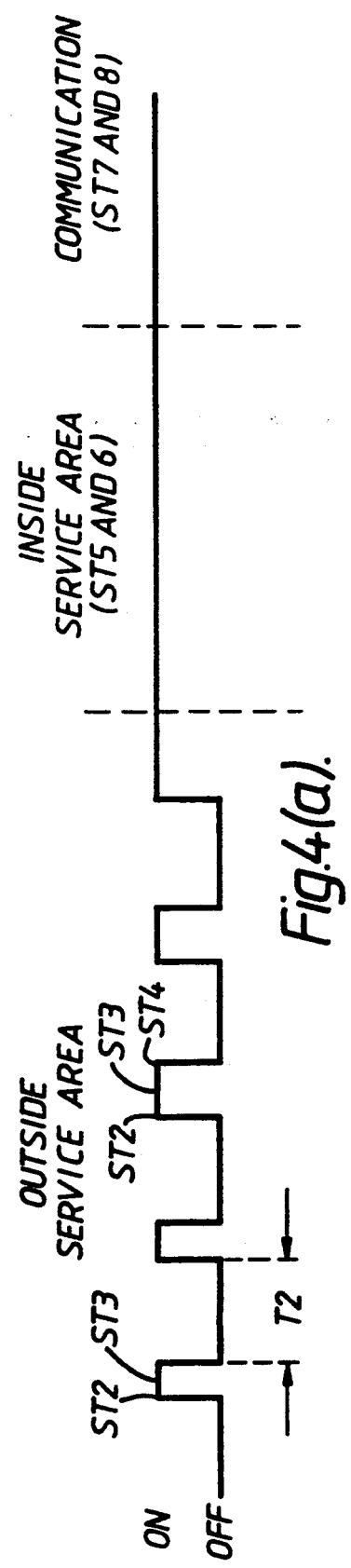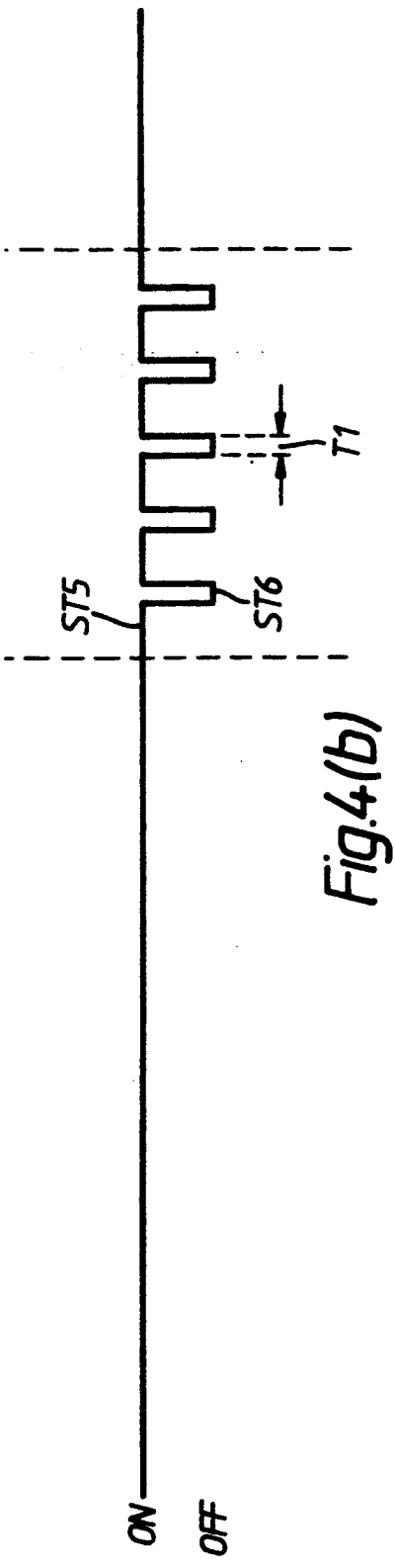

METHOD AND APPARATUS FOR REDUCING POWER CONSUMPTION IN A RADIO TELECOMMUNICATION APPARATUS

This application is a continuation of application Ser. No. 07/707,225, filed May 24, 1991 now abandoned, which is a continuation of application Ser. No. 07/365,825, filed Jun. 14, 1989 now abandoned.

This application is related by subject matter to copending application Ser. No. 07/316,922 entitled "Radio Telecommunication Apparatus" filed on Feb. 28, 1989 now U.S. Pat. No. 5,033,111.

BACKGROUND OF THE INVENTION

1. Field of the Invention

The present invention generally relates to the field of radio telecommunication apparatus such as battery-powered mobile and portable telephones and, more particularly, to an apparatus and method for reducing power consumption in a radio telecommunication apparatus used in a radio telecommunication system in which a communication link is established using a plurality of radio channels.

2. Description of the Relevant Art

Various types of radio telecommunication apparatus have been developed recently. One type is generally referred to as a mobile radio telephone. The mobile radio telephone, which may be installed in a vehicle such as a car, a train, a ship, an airplane or the like, comprises (1) a transceiver unit with an antenna and telephone unit including a handset and (2) a base unit. The transceiver and base are independent units which are coupled to each other by signal lines. The mobile radio telephone is powered by the vehicle battery.

A second type of radio telephone is generally referred to as a portable telephone. Portable telephones are further divided into two groups: a transportable type and a hand-held type. In the transportable type, the transceiver unit is incorporated into the main telephone unit and an antenna is attached thereto. Thus, a user may carry the transportable telephone. In the hand-held type, all of the components are incorporated in a single unit which may be held in the user's hand. Like the mobile unit discussed above, the transportable and hand-held telephones are battery powered.

The above-described telecommunication apparatus are used in radio telecommunication systems such as cellular radio systems. In cellular radio systems, a large geographical area is serviced by one or more base stations by dividing the area into a plurality of small zones or cells. The zones or cells define a service area in which a mobile telephone may establish a communication link with another party. Outside the service area, however, the mobile telephone may not be served by the serving cellular radio system.

It is desirable to reduce power consumption in a radio telecommunication apparatus since the battery installed therein or in the vehicle has limited power capacity. As an example, in paging devices and systems, power consumption is reduced by dividing all of the pagers in a paging system into a plurality of groups. Power supplied to the radio section of a particular pager is periodically switched on and off such that only paging signals directed to the group to which the particular pager belongs are received. This technique for reducing power consumption of the battery is generally referred to as a group battery saving technique.

However, it is difficult to apply the group battery saving technique to the above-described radio telecommunication system since a plurality of radio channels are used in radio systems. In addition, radio telecommunication apparatus such as mobile telephones are not divided into groups. Further, radio telecommunication apparatus not only recieve radio signals but also transmit radio signals over one or more radio channels.

Therefore, in prior art radio telephone apparatus, power is continuously supplied to the radio telephone after an associated power switch is switched on.

Commonly assigned U.S. patent application Ser. No. 07/316,922, filed Feb. 28, 1989 now U.S. Pat. No. 5,033,111 entitled "Radio Telecommunication Apparatus" discloses an improved radio telecommunication apparatus capable of conserving battery power by controlling the power supplied to the transmitter.

SUMMARY OF THE INVENTION

Accordingly, it is an object of the present invention to provide an improved radio telecommunication apparatus and method which reduce power consumption.

It is another object of the present invention to provide an improved radio telecommunication apparatus and method which reduce power consumption by controlling the power supplied to a receiver.

It is still another object of the present invention to provide an improved radio telecommunication apparatus and method wherein power consumption is reduced both inside and outside the service area.

It is still another object of the present invention to provide an improved radio telecommunication apparatus and method which reduce power consumption within the service area without preventing a user from placing a call.

In accordance with the present invention, when no radio channel is available to receive radio signals from a base station, i.e., the apparatus is outside the geographic limit of the service area or radio signals from the base station are unable to reach the apparatus due to radio interference, the apparatus is intermittently powered by a battery. The duration of a power-on state is sufficient for the apparatus to detect the availability of the radio channel. Since the apparatus is intermittently powered when it is not served by a system, the battery power of the apparatus is conserved. Further, when the radio channel becomes available, the apparatus may detect its availability during the power-on state.

In accordance with another feature of the present invention, even when the radio channel is available to receive or transmit radio signals to or from a base station, reception and transmission sections of the apparatus are intermittently powered by a battery until the establishment of a communication link is requested. In this instance, an operation on input switches such as a key switch or a hook switch is continuously sensed by a control circuit which is continuously powered. The duration of a power-on state is sufficient for the apparatus to detect control signals such as an incoming call from a base station. Accordingly, whenever a user wishes to make a call and follows a call request operation, such operation is detected and the apparatus is continuously powered so as to establish a communication link. When an incoming call from a base station is detected during a power-on state, the apparatus is continuously powered so as to establish a communication link. When the communication ends, power is again intermittently to the reception and transmission sections.

BRIEF DESCRIPTION OF THE DRAWINGS

A more complete appreciation of the present invention and many of the attendant advantages thereof will be readily obtained as the present invention becomes better understood by reference to the following detailed description when considered in connection with the accompanying drawings.

FIGS. 4(a) and (b) are diagrams illustrating the switching operations of switches 192a and 192b shown in FIG. 3.

DETAILED DESCRIPTION OF THE PREFERRED EMBODIMENT

A preferred embodiment of the present invention as applied to a radio telephone will be described with reference to the accompanying drawings. However, the invention is not limited in this respect and may be employed in other types of radio communication apparatus used in radio telecommunication systems such as cellular systems.

Figure 1:
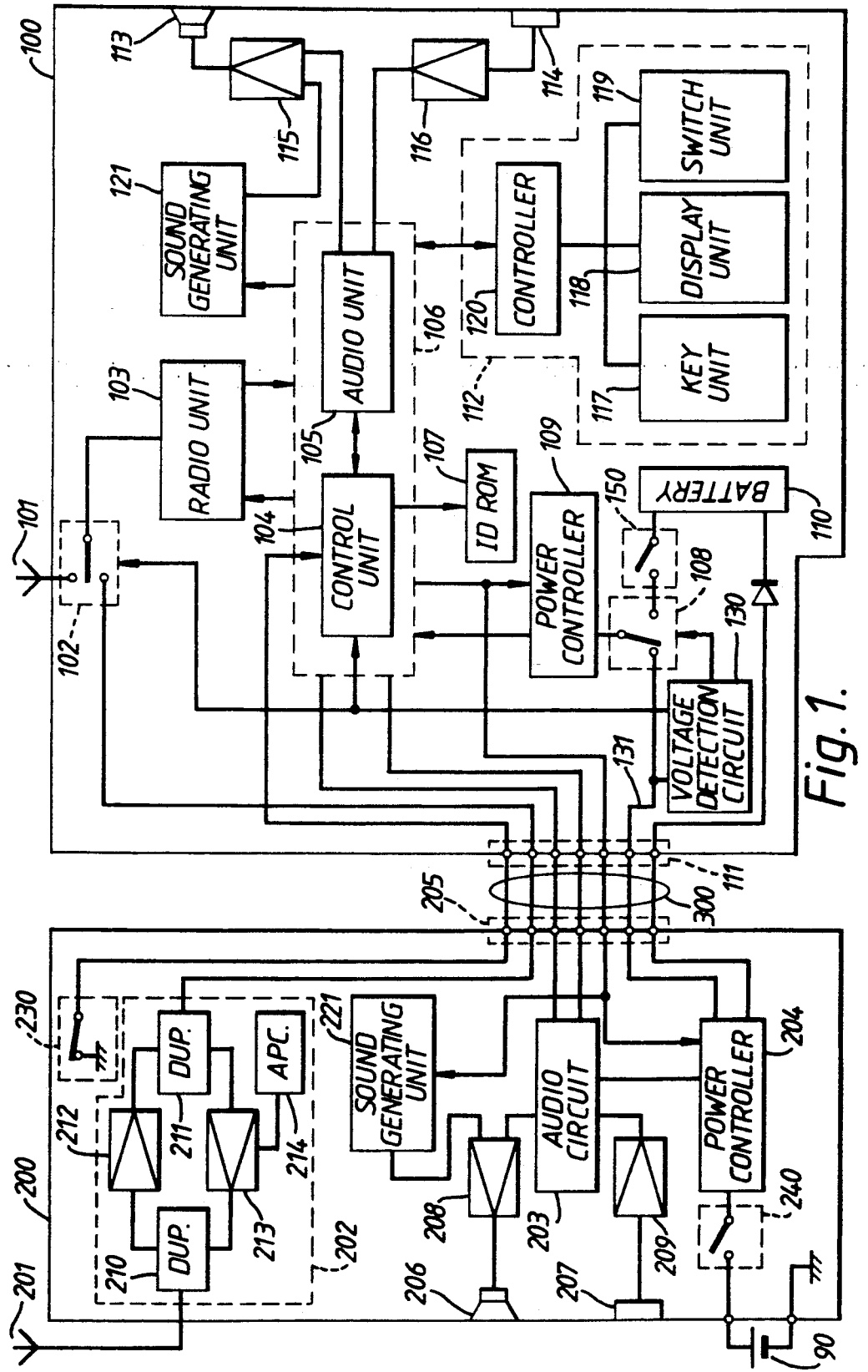
FIG. 1 is a block diagram of a mobile telephone in accordance with an embodiment of the present invention.

FIG. 1 is a block diagram illustrating a mobile radio telephone according to one embodiment of the present invention. The mobile telephone of this embodiment is an improved cellular radio telephone wherein a portable unit 100 may be operational by itself or coupled with an adaptor unit 200.

Portable unit 100 includes antenna 101, power switch 150, switch circuits 102 and 108, loudspeaker 113, microphone 114, output amplifier 115, and input amplifier 116. Radio unit 103 establishes radio channels with a base station (not shown). Audio control unit 106 includes control unit 104 and audio unit 105 and controls the overall operation of the apparatus. The details of audio control unit 106 and radio unit 103 will be discussed below with reference to FIG. 2. Output amplifier 115 amplifies the sound signals from sound generating unit 121 or audio unit 105 of portable unit 100 and outputs the amplified sound signal to loudspeaker 113. Input amplifier 116 amplifies the sound signals from microphone 114. The amplified signals are provided to audio unit 105. ID ROM 107 stores an identification number associated with the mobile telephone. Power controller 109 selectively supplies power from rechargeable battery 110 or from adaptor unit 200. Connector 111 couples portable unit 100 with adaptor unit 200. Sound generating unit 121 produces a prescribed audio signal. Voltage detection circuit 130 detects the voltage level of power supply path 131.

Operation unit 112 includes key unit 117 for key inputs, display unit 118 for displaying characters, switch unit 119, and controller 120 for controlling the operation of key unit 117 and display unit 118. Display unit 118 comprises a liquid crystal display device and a display driver. The display driver drives the liquid crystal display device in response to control signals from controller 120 to effect a prescribed display. Controller 120 controls display unit 118 in accordance with control signals from audio control unit 106. Controller 120 also transfers control signals input via key unit 117 to audio control unit 106. Key unit 117 comprises a key pad including number keys "0"-"9" and function keys (e.g., "#", "*", "SEND", "FCN", etc.). When a key is depressed, the depression is detected by controller 120. Switch unit 119 is provided with a hook switch and a changeover switch. Switch unit 119 detects the ON or OFF hook state of portable unit 100 by means of the hook switch. Hook switch 230 may also be provided on adaptor unit 200.

Adaptor unit 200 includes antenna 201 mounted on the vehicle, booster unit 202, audio circuit 203, power controller 204, connector 205, loudspeaker 206, microphone 207, output amplifier 208, input amplifier 209, sound generating unit 221, hook switch 230, and power switch 240. Booster unit 202 includes duplexers 210 and 211, reception amplifier 212, transmission power amplifier 213, and automatic power control circuit (APC) 214. Vehicle battery 90 is coupled to power controller 204 via power switch 240. Portable unit 100 may be coupled to adaptor unit 200 via coaxial cable 300.

Figure 2:
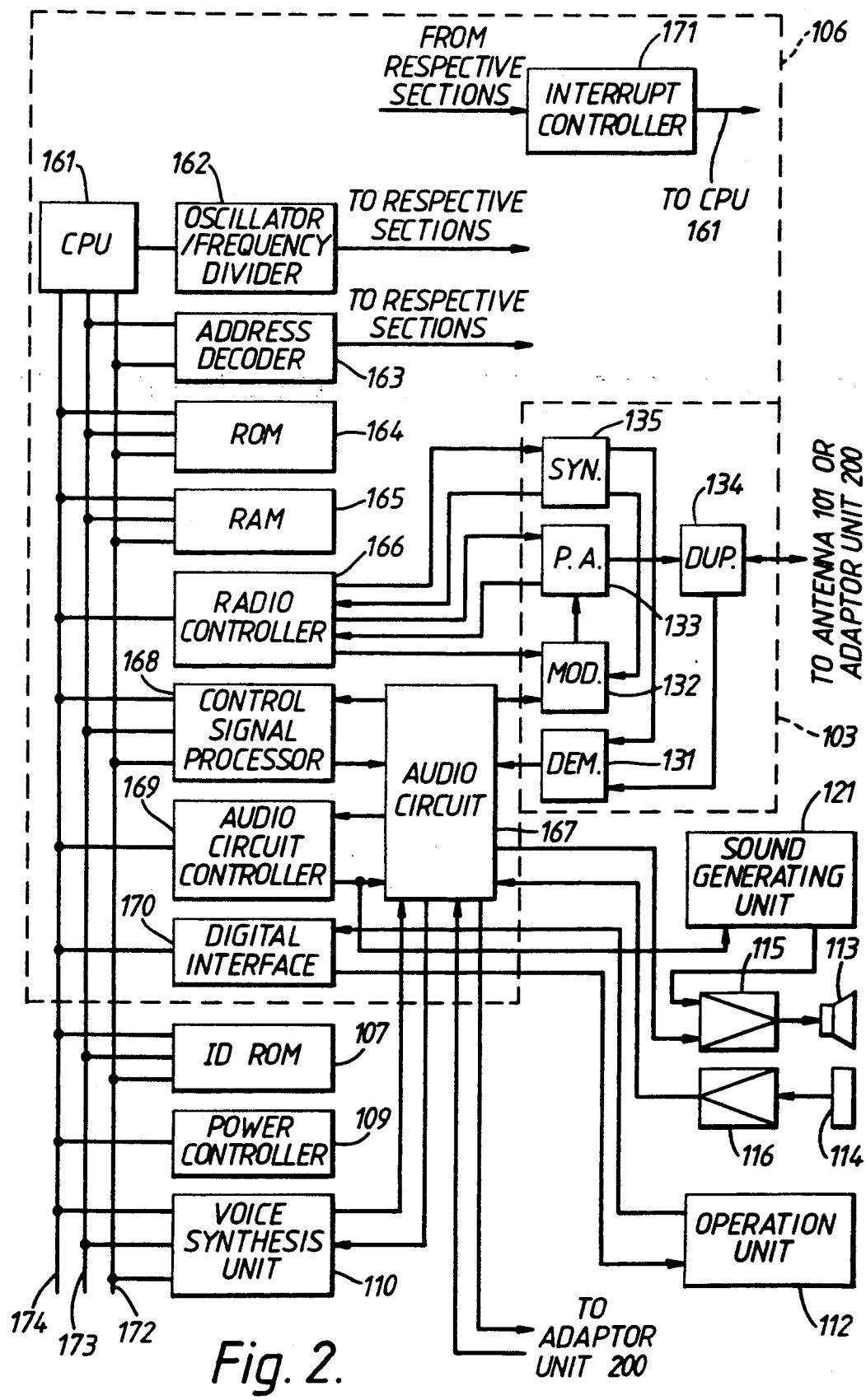
FIG. 2 is a block diagram illustrating the details of the audio control unit shown in FIG. 1.

FIG. 2 illustrates the detailed arrangement of audio control unit 106 and radio unit 103 shown in FIG. 1. Radio unit 103 includes demodulator 131, modulator 132, power amplifier 133, duplexer 134, and synthesizer 135. Demodulator 131 demodulates radio signals received from a base station over the radio channels via antenna 101 and duplexer 134. It should be noted that these radio signals include audible sound signals and control signals. Modulator 132 modulates audio signals, control signals and the like from audio control unit 106 and generates transmission signals. Power amplifier 133 amplifies the transmission signals from modulator 132. The amplification of power amplifier 133 is variable, e.g., power amplifier 133 may be an 8-step variable power amplifier. Duplexer 134 transfers received radio signals to demodulator 131. Duplexer 134 also transfers the transmission signals from demodulator 132 and power amplifier 133 to antenna 101. Synthesizer 135 is a channel selection local oscillator and specifies a frequency from which signals are demodulated by demodulator 131 and a frequency to which signals are modulated by modulator 132.

Audio control unit 106 includes CPU 161, oscillator/frequency divider 162, address decoder 163, ROM 164, RAM 165, radio controller 166, audio circuit 167, control signal processor 168, audio circuit controller 169, digital interface 170, and interrupt controller 171. Reference numeral 172 denotes a data bus; reference numeral 173 denotes an address bus; and reference numeral 174 denotes a control bus. CPU 161 controls the operation of audio control unit 106. Oscillator/frequency divider 162 supplies clock signals to CPU 161 and divides the clock signals to supply appropriate frequency-divided pulses as timing pulses to each section of the mobile telephone apparatus requiring such pulses. Address decoder 163 outputs operational signals to each section in response to instruction signals from CPU 161.

ROM 164 stores various programs required for CPU operation. RAM 165 stores various data during CPU processing. For example, a plurality of voice message data may be stored, each of which corresponds to a system identification number provided by a system serving the apparatus. Radio controller 166 controls radio section 103 in response to instructions from CPU 161. For example, radio controller 166 sends signals indicative of available frequencies to synthesizer 135, signals indicative of amplification level to power amplifier 133, and signals indicative of modulation parameters to modulator 132. Radio controller 166 receives a step-out signal from synthesizer 135 indicating that synchronization with received signals is lost and outputs power detection signals from power amplifier 133 and supplies these signals to CPU 161, thereby preventing operation errors. Audio circuit 167 extracts control signals and audio signals from the received signals demodulated by demodulator 131 and supplies the control signals to control signal processor 168 and the audio signals to loudspeaker 113. Audio circuit 167 also supplies the control signals from control signal processor 168 and audio signals from microphone 114 to modulator 132.

It should be noted that audio circuit 167 also arranges the signal form of the control signal to be sent to control signal processor 168 in a particular wave format and filters the control signal to be supplied to modulator 132. Control signal processor 168 acquires bit and frame synchronization with the control signal from audio circuit 167. Maintaining the acquired synchronization, control signal processor 168 converts serial control signals received from a base station into parallel signals and converts parallel control data signals to be transmitted to a base station into serial signals. The control signals are transferred to and from the base station via audio circuit 167. Audio circuit controller 169 controls audio circuit 167. For example, under the control of audio circuit controller 169, audio circuit 167 selectively applies the received signals from demodulator 132 to control signal processor 168 or loudspeaker 113 and selectively receives the signals from control signal processor 168, voice synthesis unit 110, or microphone 114. Digital interface 170 interfaces data communication between radio unit 103 and operation unit 112. Interrupt controller 171 interrupts CPU 161 in response to an interrupt signal from each component.

Figure 3:
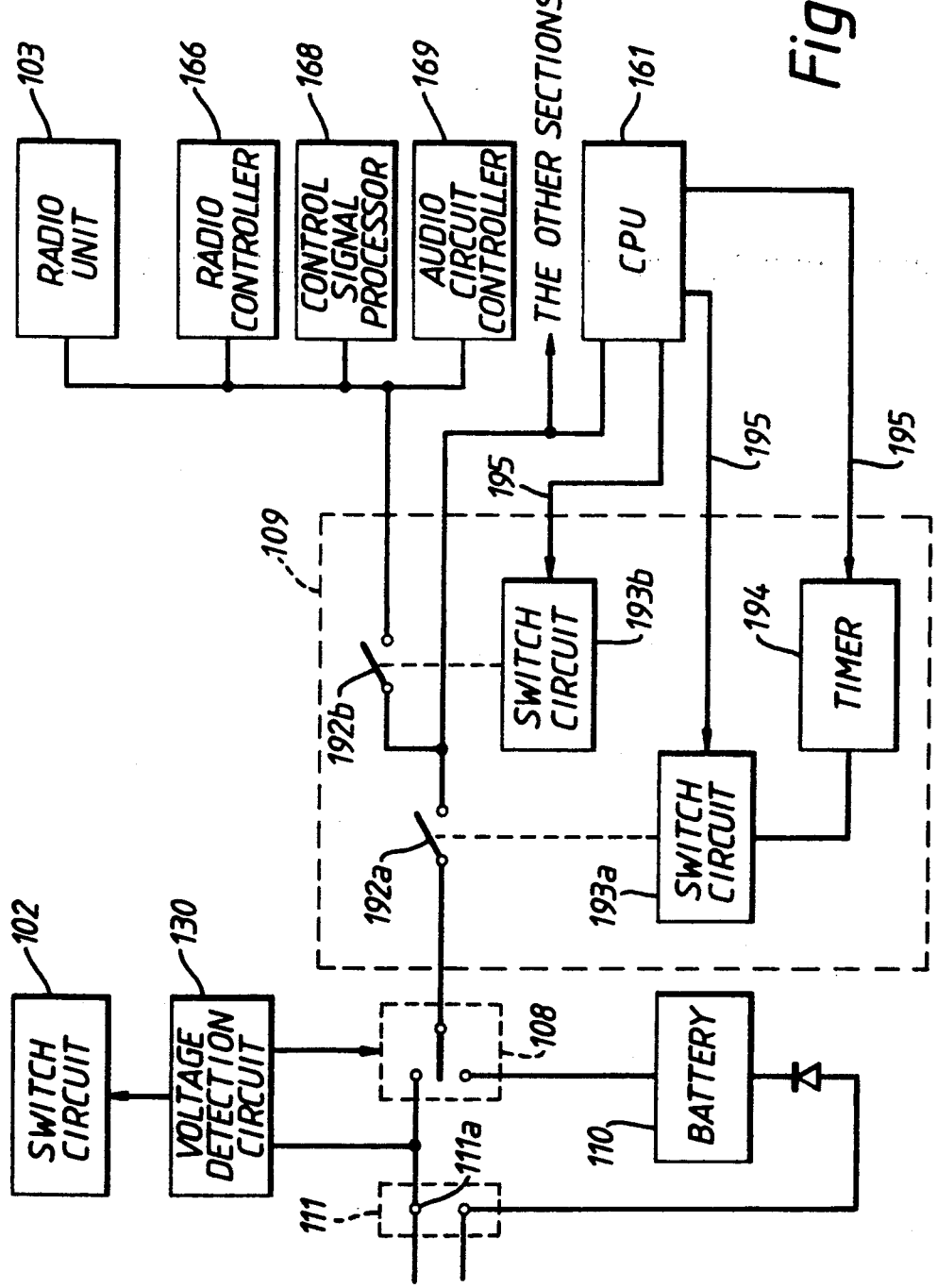
FIG. 3 is a block diagram for explaining a battery saving operation in accordance with an embodiment of the present invention.

FIG. 3 is a block diagram utilized in describing the battery saving technique for reducing power consumption in accordance with an embodiment of the present invention. If switch 240 shown in FIG. 1 is closed when portable unit 100 is coupled to adaptor unit 200, the voltage of connection terminal 111a is high level. If such high level voltage is detected by voltage detection circuit 130, voltage detection circuit 130 controls switch circuits 102 and 108 such that (1) connection terminal 111a is connected to the input of power controller 109 and (2) booster 202 of adaptor 200 is connected to radio unit 103 in portable unit 100. If, on the other hand, the voltage of connection terminal 111a is low, voltage detection circuit 130 controls switch circuits 102 and 108 such that battery 110 is coupled to the input of power controller 109 and antenna 101 is coupled to radio unit 103.

When switches 192a and 192b of power controller 109 are closed, all component sections of portable unit 100 are powered from either battery 90 or 110. When switch 192a is closed and switch 192b is open, all component sections of portable unit 100, except reception and transmission sections (radio unit 103, radio controller 166, control signal processor 168, and audio circuit controller 169) are powered. If switch 192a is opened, no component section of portable unit 100 is powered. The switching operation of switch 192b is controlled by switch circuit 193b under the control of CPU 161. The switching operation of switch 192a is controlled by switch circuit 193a under the control of CPU 161 and timer 194.

FIGS. 4(a) and (b) are diagrams illustrating the switching operations of switches 192a and 192b of FIG. 3, respectively. When it is determined that no radio channel is available for communication, i.e., the apparatus is not capable of being served by a system, switch 192a is intermittently activated by timer 194 (FIG. 4(a)). Switch 192b is kept closed (an on-state) (FIG. 4(b)). Since CPU 161 is supplied power intermittently, CPU 161 is unable to control switch circuit 193a. Instead, timer 194 controls switch circuit 193a such that switch 192a is opened for a predetermined time period T2. The operation of timer 194 is set by CPU 161 while CPU 161 is supplied power.

If it is determined that a radio channel is available for communication, i.e., the apparatus is capable of being served by a system, switch 192a is kept closed (an on-state) by CPU 161 (FIG. 4(a)). Switch 192b is intermittently actuated by CPU 161 (FIG. 4(b)) and is open for a predetermined time period T1.

Finally, when a communication link is being established or after a communication link has been established, switches 192a and 192b are maintained closed.

It is to be emphasized that radio channels may be unavailable, thereby placing an apparatus "outside" the service area, for a number of reasons. The most common reason is that the telephone is outside the geographic limits of the service area. However, even within the geographic limits of a service area, radio interference or signal degradation due to natural or man-made obstructions, e.g., mountains or tall buildings, may also result in the unavailability of a radio channel, even within the geographic limits of the service area. Weather conditions may also adversely affect the availability of radio channels within the geographic limits of the service area. Thus, the terminology "outside service area" should be broadly construed to refer to the unavailability of radio channels outside the geographic limits of the service area as well as the unavailability of radio channels within the geographic limits of a service area due to the above-described factors.

Figure 5:
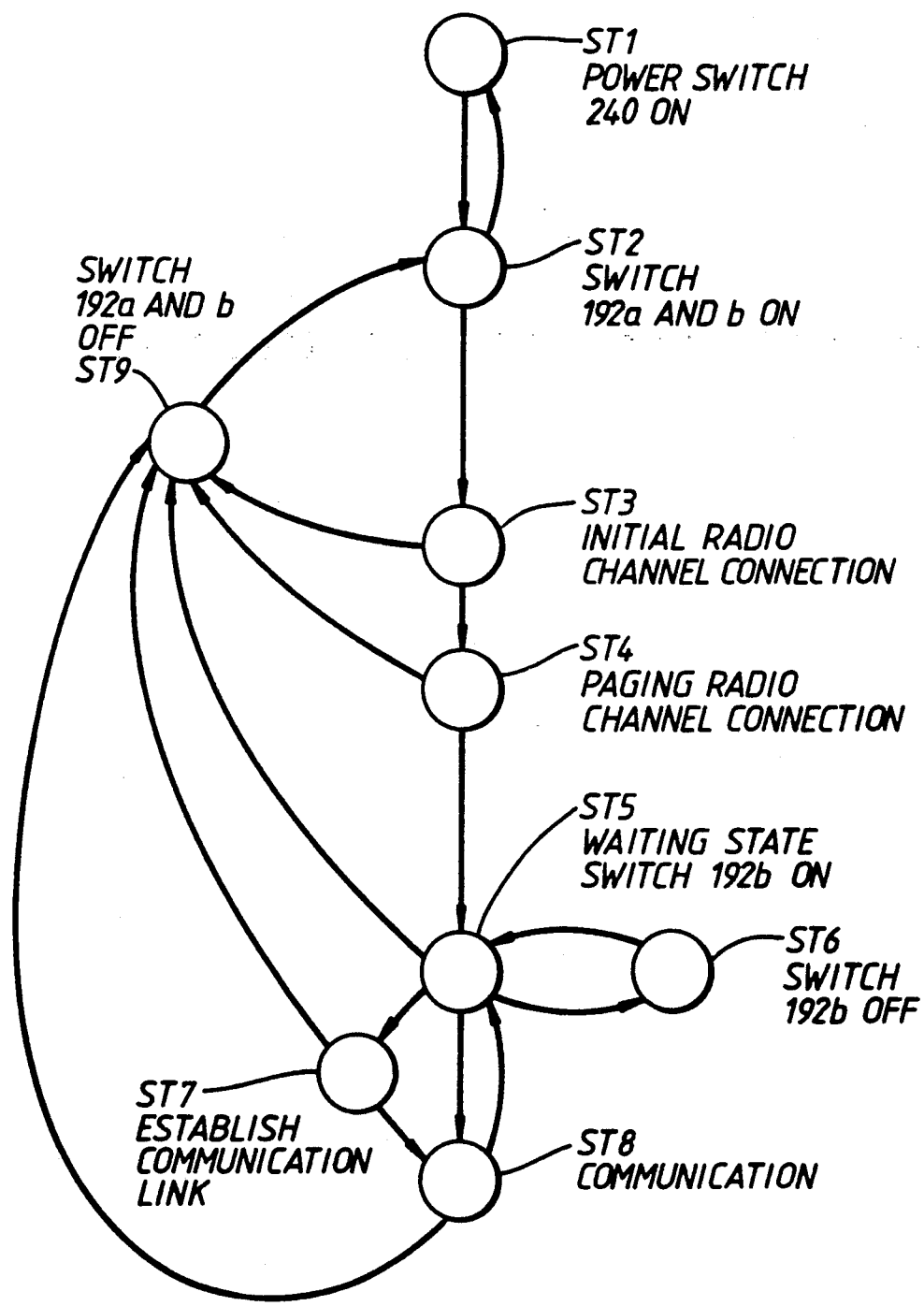
FIG. 5 is a state diagram illustrating the operation of the mobile telephone shown in FIG. 1.

The operation of the mobile telephone will be described with reference to FIG. 4 and the state diagram of FIG. 5. In this embodiment, battery saving operations for reducing power consumption are performed regardless of whether portable unit 100 and adaptor unit 200 are coupled together.

When power switch 240 is closed, each component section of adaptor unit 200 is supplied power from vehicle battery 90. In this state, since the voltage of connection terminal 111a is high level, connection terminal 111a is coupled to power controller 109 and radio unit 103 is coupled to booster 202 under the control of voltage detection circuit 130 as described above. Switches 192a and 192b are closed. Thus, each component section of portable unit 100 is supplied power from battery 90. CPU 161 is responsive to the supplied power and performs hardware checks against the other sections of portable unit 100 and adaptor unit 200. CPU 161 also sets timer 194 to provide a pulse signal to switch circuit 193a for activating switch 192a and controls switch circuits 193a and 193b such that switch 192a is activated by the pulse signal provided by timer 194 and switch 192b is kept closed (ST1 and ST2).

Figure 6:
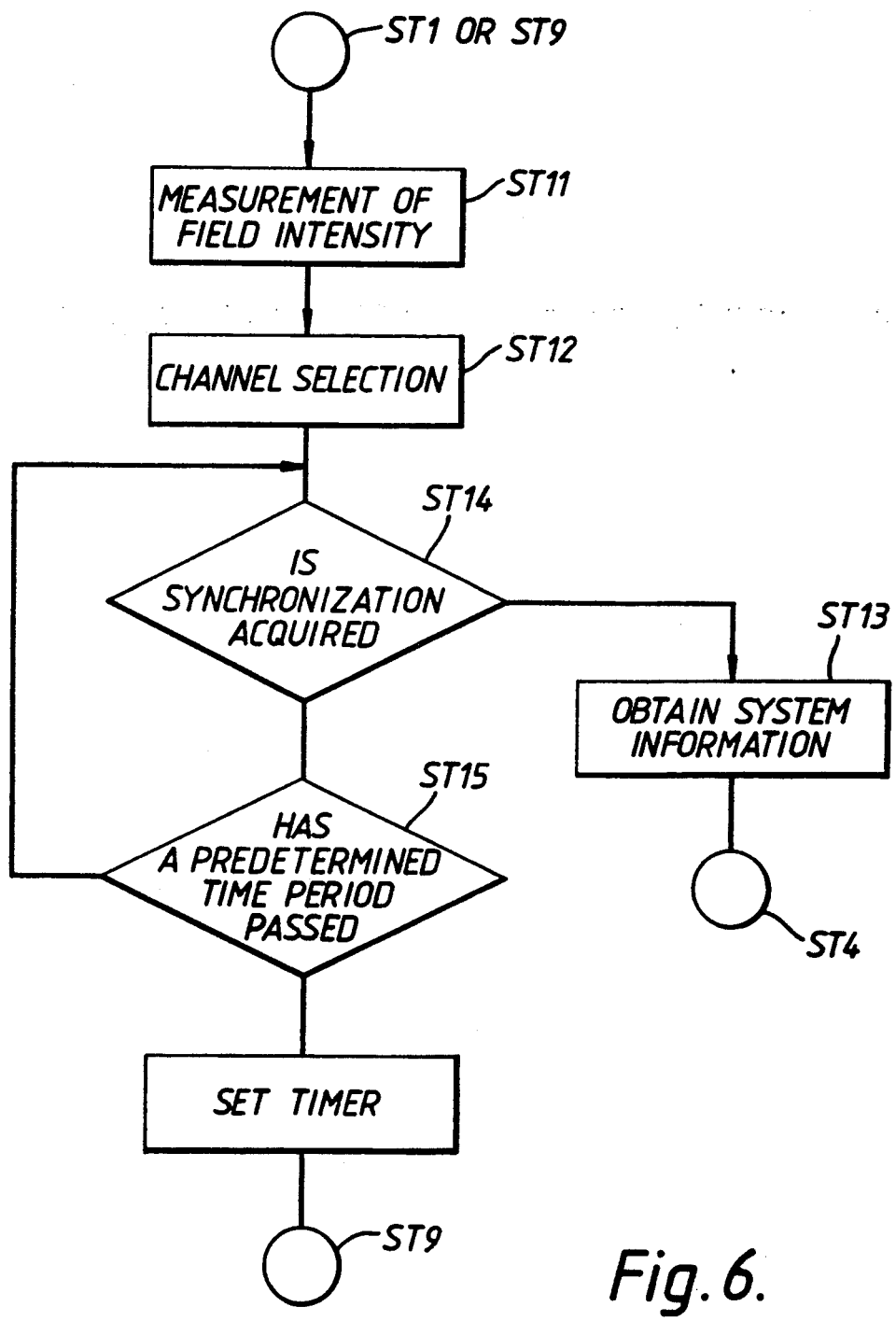
FIG. 6 is a flow chart detailing the initial radio channel connection operation shown in FIG. 5.

The operational state then proceeds to ST3. In ST3, an initialization procedure is performed. FIG. 6 is a flow chart illustrating the initial radio channel connection procedure after the power supply is switched on. In response to a control signal from CPU 161, radio controller 166 controls the output frequency of synthesizer 135 so that a predetermined range of control channels (referred to as D channels hereinafter) is scanned in demodulator 131. The electric field intensity of signals received over each channel is measured (ST11). This procedure may be implemented as shown and described in U.S. Pat. application Ser. No. 07/248,921 (incorporated herein by reference thereto). The channel having the strongest electric field intensity is selected from among the D channels and the apparatus is ready to receive signals through the selected channel having the strongest electric field intensity (ST12).

Next, under the control of CPU 161, audio circuit controller 169 controls audio circuit 167 such that the output of demodulator 131 is applied to the input of control signal processor 168 and the output of control signal processor 168 is applied to the input of modulator 132. Control signal processor 168 attempts to perform bit and frame synchronization operations on signals received over the selected channel. If the synchronization is acquired (ST14) and system information is detected within signals received over the selected channel (ST13), apparatus operation proceeds to ST4 (FIG. 5). The system information includes, for example, information of a range of frequency channels (referred to hereinafter as P channels) to be scanned next.

CPU 161 controls control signal processor 168 to attempt to acquire synchronization until a predetermined time period has passed (ST14 and 15). If synchronization is not acquired within the predetermined time period, operation of the apparatus proceeds to ST9 after timer 194 has been set to open switch 192a for the predetermined time period T2.

Figure 7:
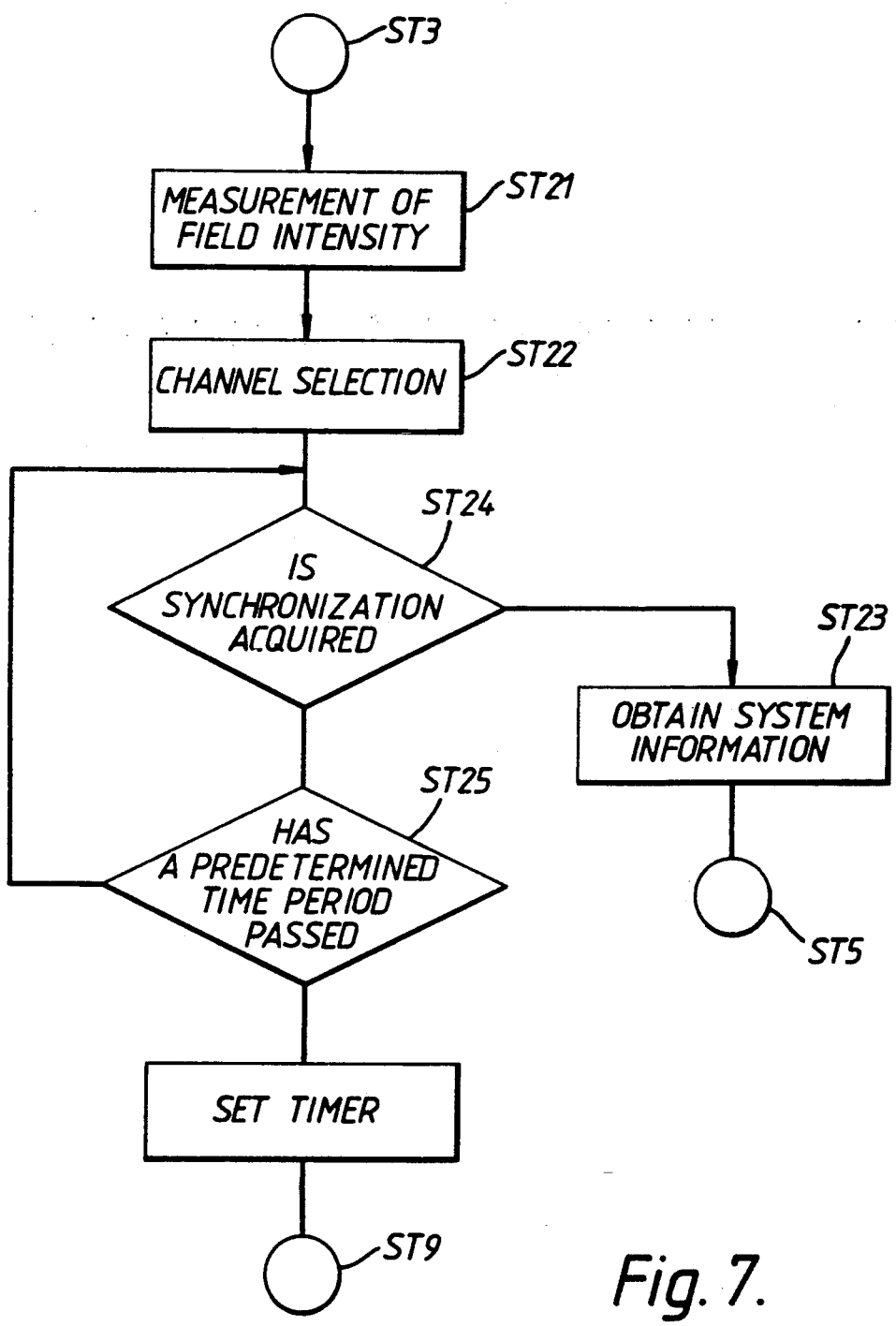
FIG. 7 is a flow chart detailing the paging radio channel connection operation shown in FIG. 5.

FIG. 7 is a flow chart describing P (paging) channel connection operation (ST4) after initialization as described above. Responsive to a control signal from CPU 161, radio controller 166 controls the output frequency of synthesizer 135 such that P channels are scanned in demodulator 131. The electric field intensity of signals received over each channel is measured as noted above (ST21). The channel having the strongest electric field intensity is selected from the P channels and the apparatus is ready to receive signals through the channel having the strongest electric field intensity (ST22).

Next, control signal processor 168 attempts to perform bit and frame synchronization on signals received over the selected P channel. If the synchronization is acquired (ST24) and system information including a system identification number is detected within signals received over the selected P channel at control signal processor 168 (ST23), the operation of the apparatus proceeds to ST5 (FIG. 5). At this time, the prescribed audio signal may be generated from sound generating unit 121. The detected system identification number is stored in a SID register of RAM 165.

CPU 161 controls control signal processor 168 to attempt to acquire synchronization until a predetermined time period has passed (ST24 and 25). If synchronization is not acquired within the predetermined time period, the operation of the apparatus proceeds to ST9 after timer 194 has been set to open switch 192a for the predetermined time period T2.

After proceeding to operational state ST5, CPU 161 sets an internal timer to provide a pulse signal to switch circuit 193b for intermittently activating switch 192b. In ST5, the pulse signal represents an on-state as shown in FIG. 4, i.e., switch 192b is closed. In ST6, the pulse signal represents an off-state, i.e., switch 192b is opened for the predetermined period T1 as shown in FIG. 4. In ST5, when switch 192b is closed and each section of the apparatus is supplied power, the apparatus awaits control signals such as an incoming call from a base station or a request for a call origination by a user while checking whether electric field intensity of received signals is below a predetermined level. If electric field intensity of received signals decreases below a predetermined level and the apparatus is thus outside the service area, the operation of the apparatus proceeds to ST9 after timer 194 has been set to open switch 192a for the predetermined time period T2.

If a request for call origination is input by a user, measurement of electric field intensity of signals received through dedicated channels and acquisition of synchronization with the signals received through the dedicated channel having the strongest electric field intensity is performed to establish an access channel (ST7). If synchronization with received signals is not acquired within a certain time period, the operation of the apparatus proceeds to ST9 after timer 194 has been set to open switch 192a for the predetermined time period T2. If the synchronization is acquired, the operation of the apparatus proceeds to ST8. If control signals requiring responses, such as incoming call signals, are received, the operational state also proceeds to ST8.

In operational state ST8, a communication link is established over a speech radio channel dedicated by the system, while the electric field intensity of signals received over the channel is being measured. Even after a speech communication link is established, if electric field intensity of received signals decreases below a predetermined level and the apparatus is thus outside the service area, operation of the apparatus proceeds to ST9 after timer 194 has been set to open switch 192a for the predetermined time period T2.

In ST9, switch 192a is opened for the predetermined time period T2 in accordance with timer 194 as shown in FIG. 4. Accordingly, the component sections of portable unit 100 are not supplied power for the time period T2 and the power consumption of battery 90 is reduced. After the predetermined time period T2 has passed, the operational state proceeds to ST2. In ST2, switches 192a and 192b are closed and the component sections of portable unit 100 are again supplied power.

The predetermined time period T2, for which switch 192a is opened in ST9, may be longer than the predetermined time period T1, for which switch 192b is opened in ST6 since it is not necessary to switch on the apparatus for as long of a time period outside the service area as inside the service area. In ST5, the duration or time period for which switch 192b is closed is sufficient to detect an incoming call or a control signal to the apparatus from a base station.

When adaptor unit 200 is disconnected from portable unit 100, voltage detection circuit 130 detects a low level voltage at connection terminal 111a and controls switch circuits 102 and 108 such that radio unit 103 is coupled to antenna 101 and power controller 109 is coupled to battery 110. Thereafter, the battery saving technique described above is performed when power switch 150 is switched on.

In the above-described embodiment, when a paging or speech radio channel is not established in ST4 or ST7 and an established radio channel is determined not to be available in ST5 or ST8, the operational state passes to ST9. This embodiment may be varied by having the operational state pass to ST3 at these events so the apparatus again tries to establish a communication link without being switched off immediately at ST9.

Although adaptor unit 200 is continuously supplied power from battery 90 in the above-described embodiment, adaptor unit 200 may also be supplied power intermittently by arranging power controller 204 in adaptor unit 200 in a similar manner as power controller 109 in portable unit 100.

Furthermore, although the battery saving technique described above is performed inside and outside the service area, the technique may be modified for utilization only outside the service area. This is implemented by retaining ST5 without transfer to ST6 when a paging radio channel is available for communication.

A second embodiment of the operation of a mobile telephone will be described with reference to FIG. 8. In this embodiment, when portable unit 100 is coupled to adaptor unit 200, the apparatus does not perform the battery saving operation. Only when portable unit 100 is disconnected from adaptor unit 200 is the battery saving technique implemented.

Figure 8:
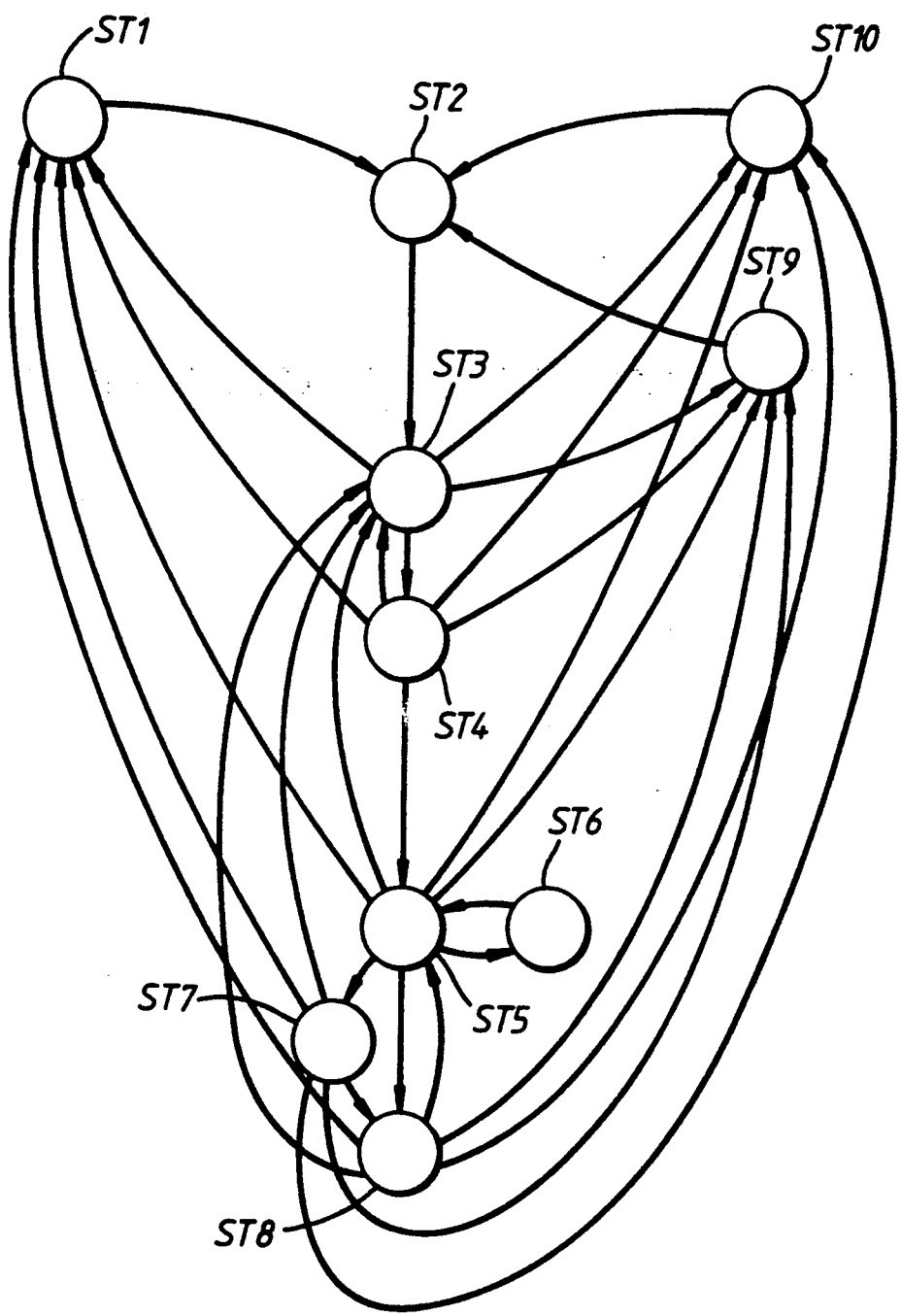
FIG. 8 is a state diagram illustrating another operation of the mobile telephone shown in FIG. 1.

FIG. 8 is a state diagram of the second embodiment. In FIG. 8, the same reference numerals are given to states which are the same state as the corresponding states shown in the state diagram of FIG. 5. When adaptor unit 200 is coupled to portable unit 100, i.e., when voltage detection circuit 130 detects a high level voltage of connection terminal 111a, if the availability of an initial or paging radio channel is not detected in ST3 or ST4, the operational state remains in or returns to ST3. If a paging, access or communication channel becomes unavailable in ST5, ST7 or ST8, the operational state returns to ST3. Additionally, the operational state does not proceed to ST6 from ST5 and switch 192b therefore remains closed.

In ST3, ST4, ST5, ST6, ST7 or ST8, when adaptor unit 200 is decoupled from portable unit 100, i.e., when voltage detection circuit 130 detects a low level voltage at connection terminal 111a, the operational state proceeds to ST10. In ST10, if power switch 150 is activated, the operational state proceeds to ST2. Thereafter, as described in the first embodiment, intermittent power is supplied by switching switch 192a in ST2 and ST9 or switch 192b in ST5 and ST6. In ST3, ST4, ST5, ST6, ST7 or ST8, when the coupling of adaptor unit 200 to portable unit 100 is detected, i.e., voltage detection circuit 130 detects a high level voltage of connection terminal 111a, the operational state proceeds to ST1.

Therefore, when a vehicle battery 90 mounted in the vehicle, having a larger capacity than battery 110, is available to power the apparatus, the apparatus is continuously powered by battery 90. When only battery 110 of portable unit 100 is available for the apparatus, the apparatus is intermittently powered. In this instance, as described above, when a radio channel is available, only reception and transmission sections are intermittently powered and the other sections are continuously powered. When no radio channel is available, the entire portable unit 100 is intermittently powered.

As a modification of the embodiment, in the event that adaptor unit 200 is coupled to portable unit 100 and no radio channel is available, the entire portable unit 100 or the entire apparatus may be intermittently powered so as to perform the battery saving operation.

Although an embodiment applied to a mobile telephone has been described, it will be apparent to those skilled in the art that the present invention may be easily applied to any kind of radio telecommunication apparatus, for example, telecommunication equipment transmitting and receiving data using radio channels.

While the foregoing description is directed to presently preferred embodiments, it will be apparent to those of ordinary skill that various modifications may be made without departing from the true spirit or scope of the invention which is to be limited only by the appended claims.

We claim:

1. A radio communication apparatus for use in a radio communication system in which at least one base station broadcasts radio signals over a plurality of radio channels, the apparatus comprising a portable radio unit and an adaptor unit connectable to the portable radio unit, wherein:

the adaptor unit includes:
first power source for powering the portable radio unit when the portable radio unit is connected with the adaptor unit; and the portable radio unit includes:
selecting means for selecting at least one radio channel from the plurality of radio channels;
receiving means responsive to the selecting means for receiving the radio signals broadcast from the base station over the selected radio channels;
first detecting means coupled to the receiving means for providing a positive detection when the selected radio channel is available for communication;
second detecting means for detecting information signals to be transmitted by the apparatus;
third detecting means for detecting whether the portable unit is connected with the adaptor unit;
transmitting means for transmitting radio signals including the information signals;
second power source whose power capacity is smaller than that of the first power source;
switching circuitry for selectively coupling the first power source and the second power source to the selecting means, the receiving means, the first detecting means, the second detecting means, and the third detecting means; and
control means for controlling the switching circuitry such that, in the event that the portable radio unit is not connected with the adaptor unit, the portable radio unit is intermittently supplied power from the second power source if the positive detection is provided by the first detecting means; and such that the receiving means and the transmitting means are continuously powered by the first or second power source in response to either the detection of information signals to be transmitted by the second detecting means or the detection of connection between the portable radio unit and the adaptor unit by the third detecting means.

2. The apparatus in accordance with claim 1 wherein the first detecting means detects whether the field intensity of the received signals exceeds a predetermined value.

3. The apparatus in accordance with claim 2 wherein the first detecting means further detects whether a predetermined signal sequence is obtained from the received signals.

4. The apparatus in accordance with claim 1 wherein the receiving means comprises a demodulator for demodulating received signals and the selecting means comprises frequency synthesizing means for providing signals having a frequency which is dedicated by the base station to the demodulator.

5. The apparatus in accordance with claim 1 wherein the second detecting means comprises sensing means for sensing an input requesting a call origination.

6. The apparatus in accordance with claim 1 wherein the second detecting means detects the presence of information signals to be transmitted in response to the reception of a control signal included in the received radio signals.

7. The apparatus in accordance with claim 6 wherein the control signal is an incoming call signal to the apparatus.

8. The apparatus in accordance with claim 6 wherein power is intermittently supplied to the receiving means for time periods of sufficient duration for the second detecting means to detect the control signal.

9. A method for reducing power consumption in a radio communication system in which at least one base station broadcasts radio signals over a plurality of radio channels, said radio communication system including an adaptor unit having a first power source and a portable radio unit connectable to the adaptor unit, the portable radio unit having selecting means for selecting at least one radio channel from the plurality of radio channels, receiving means responsive to the selecting means for receiving the radio signals broadcast from the base station over the selected radio channels, first detecting means coupled to the receiving means for providing a positive detection when the selected radio channel is available for communication, second detecting means for detecting information signals to be transmitted by the apparatus, third detecting means for detecting whether the portable unit is connected with the adaptor unit, transmitting means for transmitting radio signals including the information signals; second power source whose power capacity is smaller than that of the first power source; switching circuitry for selectively coupling the first power source and the second power source to the selecting means, the receiving means, the first detecting means, the second detecting means, and the third detecting means, comprising the step of:

controlling the switching circuitry such that, in the event that the portable radio unit is not connected with the adaptor unit, the portable unit is intermittently supplied power from the second power source if the positive detection is provided by the first detecting means; and such that the receiving means and the transmitting means are continuously powered by the first or second power source in response to either the detection of information signals to be transmitted by the second detecting means or the detection of connection between the portable radio unit and the adaptor unit by the third detecting means.

10. The method of claim 9 further comprising the step of:

controlling the switching circuitry such that, in the event that the portable radio unit is not connected with the adaptor unit, the receiving means is intermittently supplied power from the second power source only when the positive detection is not provided by the first detecting means.

11. The method of claim 9 further comprising the step of:

controlling the switching circuitry such that, in the event that the portable radio unit is not connected with the adaptor unit, the receiving means is intermittently supplied power from the second power source for time periods of a first predetermined length when the positive detection is not provided by the first detecting means and the receiving means is also intermittently supplied power from the second power source for time periods of a second predetermined length which is shorter than the first predetermined length when the positive detection is not provided by the first detecting means.

* * * * *